United States Patent
Nyström et al.

(10) Patent No.: US 10,594,163 B2
(45) Date of Patent: Mar. 17, 2020

(54) ACOUSTICAL BATTERY CHARGING

(71) Applicant: Cochlear Limited, Macquarie University, NSW (AU)

(72) Inventors: Dan Nyström, Mölndal (SE); Henrik Sunnerud, Landvetter (SE)

(73) Assignee: COCHLEAR LIMITED, Macquarie University, NSW (AU)

(*) Notice: Subject to any disclaimer, the term of this patent is extended or adjusted under 35 U.S.C. 154(b) by 125 days.

(21) Appl. No.: 15/597,278

(22) Filed: May 17, 2017

(65) Prior Publication Data

US 2018/0337561 A1 Nov. 22, 2018

(51) Int. Cl.
- *H04R 25/00* (2006.01)
- *H02J 50/15* (2016.01)
- *H02J 7/00* (2006.01)
- *H02N 2/18* (2006.01)

(52) U.S. Cl.
CPC .......... *H02J 50/15* (2016.02); *H02J 7/00* (2013.01); *H02N 2/181* (2013.01); *H04R 25/602* (2013.01); *H04R 25/606* (2013.01); *H04R 25/505* (2013.01); *H04R 2225/31* (2013.01); *H04R 2225/67* (2013.01)

(58) Field of Classification Search
CPC ...... H04R 15/00; H04R 17/00; H04R 25/602; H04R 2225/31; H04R 2225/67; H02J 50/15; H02J 7/0052
See application file for complete search history.

(56) References Cited

U.S. PATENT DOCUMENTS

| | | | | |
|---|---|---|---|---|
| 5,749,909 A | * | 5/1998 | Schroeppel | A61N 1/3787 607/33 |
| 8,721,518 B2 | | 5/2014 | Hellmuth et al. | |
| 2008/0205678 A1 | * | 8/2008 | Boguslavskij | H02J 7/025 381/312 |
| 2010/0092021 A1 | * | 4/2010 | Wiskerke | H04R 1/08 381/364 |
| 2010/0164433 A1 | * | 7/2010 | Janefalkar | H02J 7/025 320/115 |
| 2010/0179615 A1 | * | 7/2010 | Zhang | A61N 1/36036 607/57 |
| 2011/0112355 A1 | | 5/2011 | Van den Heuvel | |
| 2013/0016862 A1 | * | 1/2013 | Newton | H04R 25/554 381/323 |
| 2013/0018216 A1 | | 1/2013 | Beckerle et al. | |
| 2014/0241557 A1 | | 8/2014 | Martius et al. | |
| 2014/0363006 A1 | | 12/2014 | Cherigui | |

FOREIGN PATENT DOCUMENTS

WO 2007097892 A2 8/2007

OTHER PUBLICATIONS

International Search Report and Written Opinion in corresponding International Application No. PCT/IB2018/053230, dated Oct. 18, 2018.

* cited by examiner

*Primary Examiner* — Sunita Joshi

(74) *Attorney, Agent, or Firm* — Edell, Shapiro & Finnan, LLC

(57) ABSTRACT

Presented herein are techniques for acoustically charging an implantable rechargeable battery. In accordance with embodiments presented herein, a sound sensor is implanted in a recipient and is configured to detect sound signals. The sound sensor is configured to convert the detected sound signals into electrical signals that can be used to charge the implantable rechargeable battery.

26 Claims, 6 Drawing Sheets

ACOUSTICAL BATTERY CHARGING

BACKGROUND

Field of the Invention

The present invention relates generally to implantable auditory prosthesis and, more particularly, to acoustical battery charging in an implantable auditory prosthesis.

Related Art

Hearing loss, which may be due to many different causes, is generally of two types: conductive and sensorineural. Sensorineural hearing loss is due to the absence or destruction of the hair cells in the cochlea that transduce sound signals into nerve impulses. Various auditory or hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of auditory prostheses, such as bone conduction device, middle ear implants, etc., convert received sounds into vibrations. These vibrations are transferred to the cochlea causing generation of nerve impulses, which result in the perception of the received sound.

SUMMARY

In one aspect, an implantable auditory prosthesis is provided. The implantable auditory prosthesis comprises: a sound processor; at least one rechargeable battery; battery charging circuitry configured to charge the at least one rechargeable battery; a piezoelectric sensor configured to convert sounds received at an ear of a recipient into electrical signals; and adaptive forwarding circuitry configured to deliver the electrical signals to one of the battery charging circuitry or the sound processor.

In another aspect, an implantable auditory prosthesis is provided. The implantable auditory prosthesis comprises: at least one rechargeable battery; battery charging circuitry configured to charge the at least one rechargeable battery; an implantable sound sensor configured to convert sound signals into electrical signals; and circuitry configured to deliver at least a portion of the electrical signals to the battery charging circuitry for use in charging the at least one rechargeable battery.

In another aspect, a method is provided. The method comprises: detecting, at an implantable sound sensor, vibration of an auditory element of an ear of a recipient of an implantable auditory prosthesis, wherein the vibration is generated in response to acoustic sounds entering an outer ear of the recipient; converting, by the implantable sound sensor, the vibration of the auditory element into electrical signals; providing, with implantable circuitry, at least a portion of the electrical signals to battery charging circuitry; and at the battery charging circuitry, using the at least portion of the electrical signals to recharge at least one rechargeable battery.

BRIEF DESCRIPTION OF THE DRAWINGS

Embodiments of the present invention are described herein in conjunction with the accompanying drawings, in which.

DETAILED DESCRIPTION

Embodiments presented herein are generally directed to techniques for acoustically charging (recharging) an implantable rechargeable battery. In accordance with embodiments presented herein, a sound sensor is implanted in a recipient and is configured to detect sound signals. The sound sensor is configured to convert the detected sound signals into electrical signals that can be used to charge the implantable rechargeable battery. In certain embodiments, the electrical signals are provided to adaptive forwarding circuitry that is configured to selectively provide the electrical signals to a sound processor for use in evoking a hearing percept or to a battery charging circuitry for recharging the implantable rechargeable battery.

Merely for ease of illustration, the acoustical charging techniques presented herein will generally be described with reference to a specific implantable auditory prosthesis, namely an implantable middle ear prosthesis, sometimes referred to as a "middle ear implant." However, it is to be appreciated that the acoustical charging techniques presented herein can be implemented in a number of different types of implantable auditory prostheses, such as cochlear implants, auditory brainstem stimulators, electro-acoustic hearing prostheses, bimodal hearing prostheses, direct cochlear stimulators, etc.

Figure 1A:
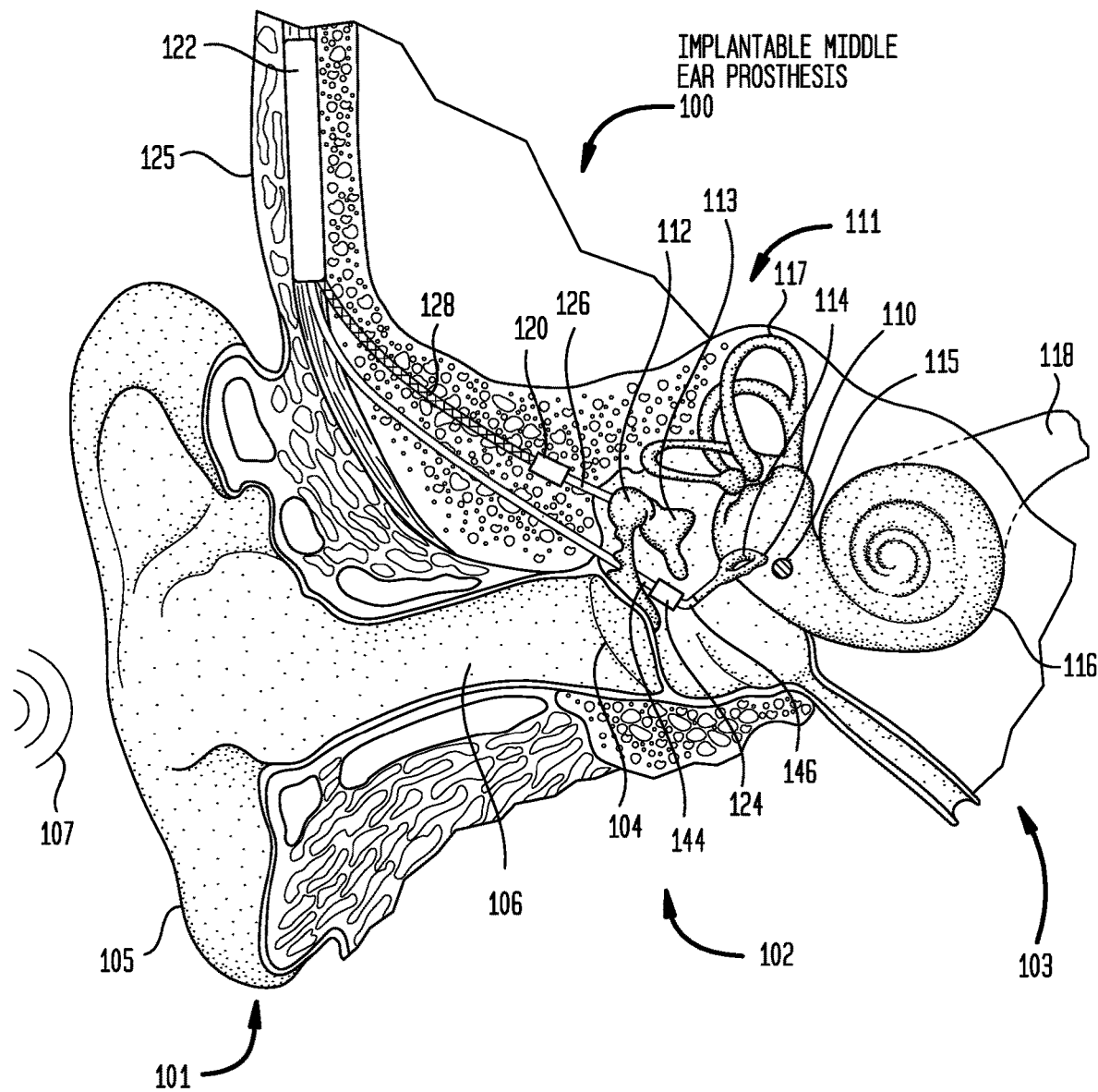
FIG. 1A is a schematic diagram illustrating an implantable auditory prosthesis in accordance with embodiments presented herein implanted in a recipient.
Figure 1B:
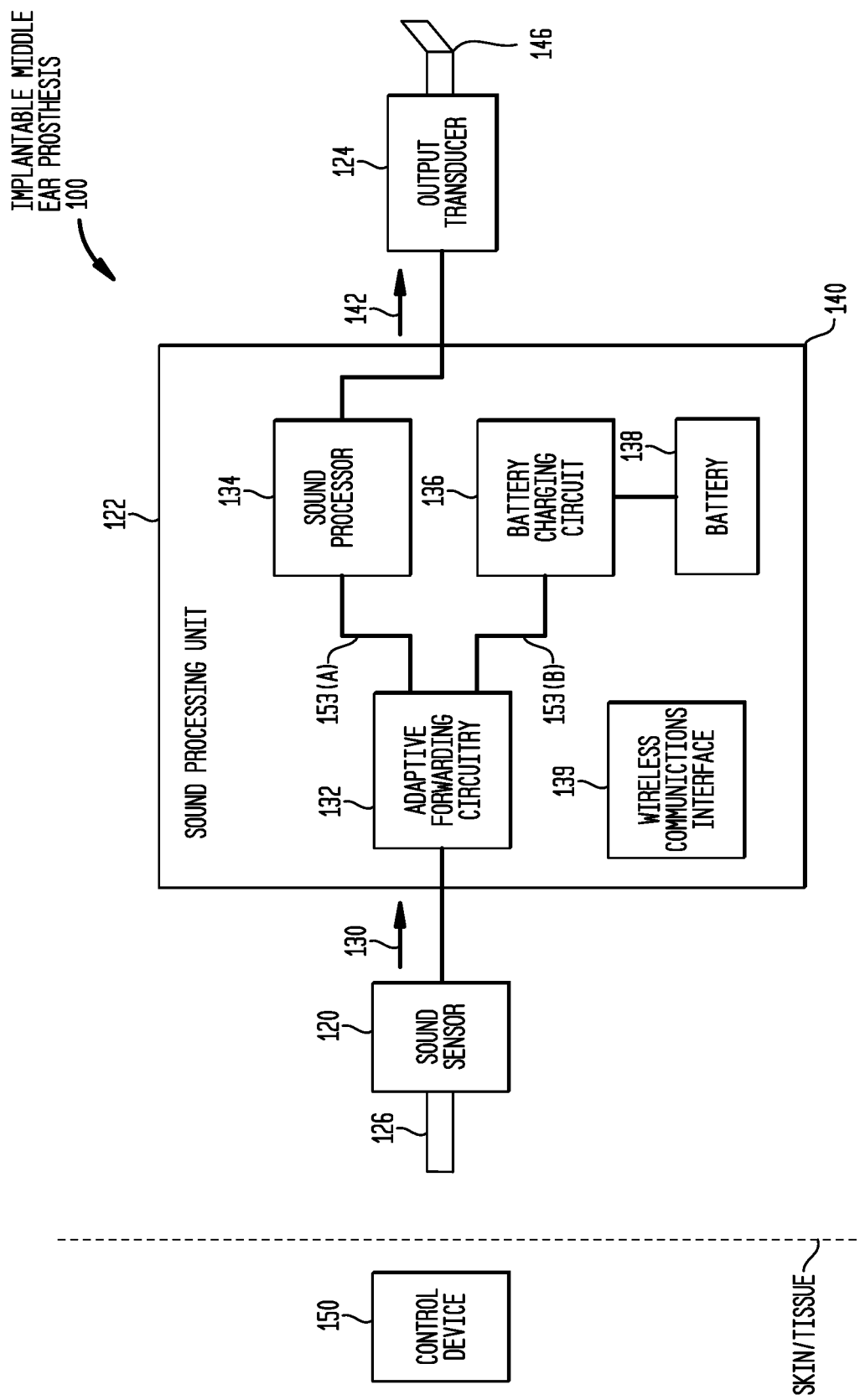
FIG. 1B is a block diagram of the implantable auditory prosthesis of FIG. 1A.

FIG. 1A is a schematic diagram illustrating an implantable middle ear prosthesis 100 in accordance with embodiments presented herein. The implantable middle ear prosthesis 100 is shown implanted in the head 125 of a recipient. FIG. 1B is a block diagram of the implantable middle ear prosthesis 100. For ease of description, FIGS. 1A and 1B will be described together.

Shown in FIG. 1A is an outer ear 101, a middle ear 102 and an inner ear 103 of the recipient. In a fully functional human hearing anatomy, the outer ear 101 comprises an auricle 105 and an ear canal 106. Sound signals 107, sometimes referred to herein as acoustic sounds or sound waves, are collected by the auricle 105 and channeled into and through the ear canal 106. Disposed across the distal end of the ear canal 106 is a tympanic membrane 104 which vibrates in response to the sound signals (i.e., sound waves) 107. This vibration is coupled to the oval window or fenestra ovalis 110 through three bones of the middle ear 102, collectively referred to as the ossicular chain or ossicles 111 and comprising the malleus 112, the incus 113 and the stapes 114. The ossicles 111 of the middle ear 102 serve to filter and amplify the sound signals 107, causing oval window 110 to vibrate. Such vibration sets up waves of fluid motion within the cochlea 116 which, in turn, activates hair cells (not shown) that line the inside of the cochlea 116. Activation of these hair cells causes appropriate nerve impulses to be transferred through the spiral ganglion cells and the auditory nerve 118 to the brain (not shown), where they are perceived as sound.

As noted above, conductive hearing loss may be due to an impediment to the normal mechanical pathways that provide sound to the hair cells in the cochlea 116. One treatment for conductive hearing loss is the use of an implantable middle ear prosthesis, such as implantable middle ear prosthesis 100 shown in FIGS. 1A and 1B. The middle ear prosthesis 100 is, in general, configured to convert sound signals entering the recipient's outer ear 101 into mechanical vibrations that are directly or indirectly transferred to the cochlea 116, thereby causing generation of nerve impulses that result in the perception of the received sound.

The implantable middle ear prosthesis 100 comprises a sound sensor (microphone) 120, a sound processing unit 122, and an output transducer 124. The sound sensor 120, sound processing unit 122, and the output transducer 124 are all implanted in the head 125 of the recipient. The sound sensor 120 and the output transducer 124 can each include hermetically-sealed housings which, for ease of illustration, have been omitted from FIGS. 1A and 1B.

The sound sensor 120 is mechanically coupled to an auditory element of the recipient's ear that vibrates in response to receipt of sound signals 107, such as the tympanic membrane 104, the ossicles 111 (e.g., one or more of the malleus 112, the incus 113 or the stapes 114), the oval window 110, the recipient's round window 115, semicircular canals 117, etc. In the illustrative embodiment of FIGS. 1A and 1B, the sound sensor 120 is mechanically coupled to the malleus 112 via a coupling element 126.

In the embodiment of FIGS. 1A and 1B, the outer 101 is functional and, as noted above, is able to collect and channel sound signals 107 through the ear canal 106. The sound signals 107 cause the tympanic membrane 104 to vibrate which, in turn, causes vibration of the malleus 112. As noted, the sound sensor 120 is mechanical coupled to the malleus 112 via a coupling element 126 that relays the vibration of the malleus 112 to the sound sensor. The sound sensor 120 is configured to convert the vibration of the malleus 112 (detected by virtue of the mechanical coupling to the malleus 112) into electrical signals that are provided to the sound processing unit 122 via a lead (e.g., one or more hermetically sealed wires) 128. FIG. 1B schematically illustrates electrical signals 130 that are generated by the sound sensor 120 based on (in response to) vibration of the malleus 112 and, accordingly, in response to receipt of the sound signals 107. In the embodiment of FIGS. 1A and 1B, the stapes 114 is disarticulated (dissected) from the malleus 112 and the incus 113.

In certain embodiments, the sound sensor 120 is a piezoelectric (piezo) sensor. A piezoelectric sensor is a type of sound sensor that includes a piezoelectric material that senses vibrations (e.g., vibrations of the malleus 112 via a coupling element 126). The piezoelectric material generates electrical signals that correspond to the sensed vibration. In general, piezoelectric sensors are passive components that do not require power to operate. In other embodiments, the sound sensor 120 can be a subcutaneous microphone, a tube microphone, an electro-magnetic microphone, etc.

As shown in FIG. 1B, the sound processing unit 122 comprises adaptive forwarding circuitry 132, a sound processor 134, battery charging circuitry 136, at least one rechargeable battery 138, and a communications interface 139, all of which are disposed in a hermetically-sealed housing 140. In general, the wireless communications interface 139 comprises one or more elements that enable the prosthesis to wirelessly communicate with one or more external control devices. FIG. 1B illustrates an example external control device 150 that can be, for example, a dedicated or programmed remote control device, a mobile computing device (e.g., mobile phone, tablet computer, etc.) executing a control application, or other device that is configured to wirelessly communicate with the implantable middle ear prosthesis 100. The implantable middle ear prosthesis 100 and the external control device 150 are sometimes collectively referred to herein as an implantable auditory prosthesis system.

The at least one rechargeable battery 138 is configured to supply to power to the other components of the implantable middle ear prosthesis 100. For ease of illustration, connections between the at least one rechargeable battery 138 and the various powered components of the implantable middle ear prosthesis 100 have been omitted from FIG. 1B.

The at least one rechargeable battery 138 can only store a finite amount of power for use by the other powered components of the implantable middle ear prosthesis 100. As such, the at least one rechargeable battery 138 may need to be charged (recharged). In accordance with embodiments of the present invention, the at least one rechargeable battery 138 is charged using energy harvested from sound signals received at the outer ear 101 of the recipient. That is, as described further below, the battery charging circuitry 136 is configured to receive all or a portion of the electrical signals 130 generated by the sound sensor 120 and to use the received electrical signals to charge the at least one rechargeable battery 138.

In the embodiments of FIGS. 1A and 1B the use of the electrical signals 130 for recharging the at least one rechargeable battery 138 depends on the configuration/operation of the adaptive forwarding circuitry 132. The adaptive forwarding circuitry 132 is configured to, under certain conditions, selectively forward all or a portion of the electrical signals 130 received from the sound sensor to the sound processor 134 or to the battery charging circuitry 136. Electrical signals forwarded to the sound processor 134 can be used to evoke a hearing percept (i.e., enable the recipient to perceive the sound signals 107), while electrical signals forwarded to the battery charging circuitry 136 can be used to charge the at least one rechargeable battery 138.

More specifically, in certain arrangements (e.g., given certain conditions described further below) the adaptive forwarding circuitry 132 is configured to receive the electrical signals 130 from the sound sensor 120 and to forward all or a portion of the received electrical signals 130 to the sound processor 134. The electrical signals forwarded from the adaptive forwarding circuitry 132 to the sound processor 134 are represented in FIG. 1B by arrow 153(A).

In response, the sound processor 134 processes (e.g., adjusts amplifies, etc.) the received electrical signals 153(A) according to the hearing needs of the recipient. That is, the sound processor 134 converts the electrical signals 153(A) into processed signals 142. The processed signals 142 generated by the sound processor 134 are then provided to the output transducer 124 via a lead 144. The output transducer 124 is configured to convert the processed signals 142 into vibrations for delivery to hearing anatomy of the recipient.

In the embodiment of FIGS. 1A and 1B, the output transducer 124 is mechanically coupled to the stapes 114 via a coupling element 146. As such, the coupling element 146 relays the vibration generated by the output transducer 124 to the stapes 114 which, in turn, causes oval window 110 to vibrate. Such vibration of the oval window 110 sets up waves of fluid motion within the cochlea 116 which, in turn, activates hair cells (not shown) that line the inside of the cochlea 116. Activation of these hair cells causes appropriate nerve impulses to be transferred through the spiral ganglion cells and the auditory nerve 118 to the brain (not shown), where they are perceived as sound. As noted above, in the embodiment of FIGS. 1A and 1B, the stapes 114 is disarticulated from the malleus 112 and the incus 113. As such, the vibration of the malleus 112 and/or the incus 113 in response to the impingement of the sound signal 107 on the tympanic membrane 104 does not cause vibration of the stapes 114. Similarly, vibration delivered to the stapes 114 by the output transducer 124 does not cause vibration of the malleus 112 or the incus 113.

As noted above, in certain arrangements (e.g., given certain conditions described further below), the adaptive forwarding circuitry 132 is also configured to receive the electrical signals 130 from the sound sensor 120 and to forward all or a portion of the received electrical signals 130 to the battery charging circuitry 136. The electrical signals forwarded from the adaptive forwarding circuitry 132 to the battery charging circuitry 136 are represented in FIG. 1B by arrow 153(B). The battery charging circuitry 136 is configured to use the electrical signals 153(B) received from the adaptive forwarding circuitry 132 to recharge the at least one battery 138. In one embodiment, the battery charging circuitry 136 is a trickle-charge circuit.

The adaptive forwarding circuitry 132 can be configured in a number of different manners so as to, under certain conditions, selectively forward all or a portion of the electrical signals 130 received from the sound sensor to the battery charging circuitry 136 for use in charging the at least one battery 138. In one embodiment, the adaptive forwarding circuitry 132 is configured to forward all or a portion of the electrical signals 130 to the implantable middle ear prosthesis 100 based on an operational mode or status of the implantable middle ear prosthesis 100. For example, the adaptive forwarding circuitry 132 can be configured to detect when the implantable middle ear prosthesis 100 is powered off/down such that the sound processor 134 is non-operable/disabled (i.e., the sound processor 134 is unable to process the electrical signals 130). In these embodiments, upon detecting that the implantable middle ear prosthesis 100 is powered off, the adaptive forwarding circuitry 132 is configured to forward all of the electrical signals 130 to the battery charging circuitry 136. That is, the adaptive forwarding circuitry 132 provides all electrical signals 130 received during the period of time in which while the sound processor 134 is disabled to the battery charging circuitry 136.

The implantable middle ear prosthesis 100 can be powered off via wireless communication with an external control device 150. As noted, the implantable middle ear prosthesis 100 comprises a wireless communications interface 139 that enables the prosthesis to communicate with the external control device 150.

Figure 2A:
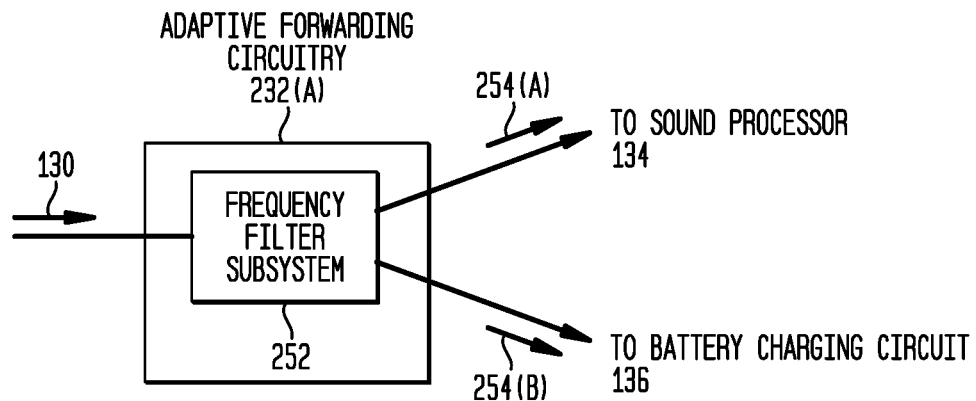
FIG. 2A is a block diagram illustration one embodiment for adaptive forwarding circuitry, in accordance with embodiments presented herein.
Figure 2B:
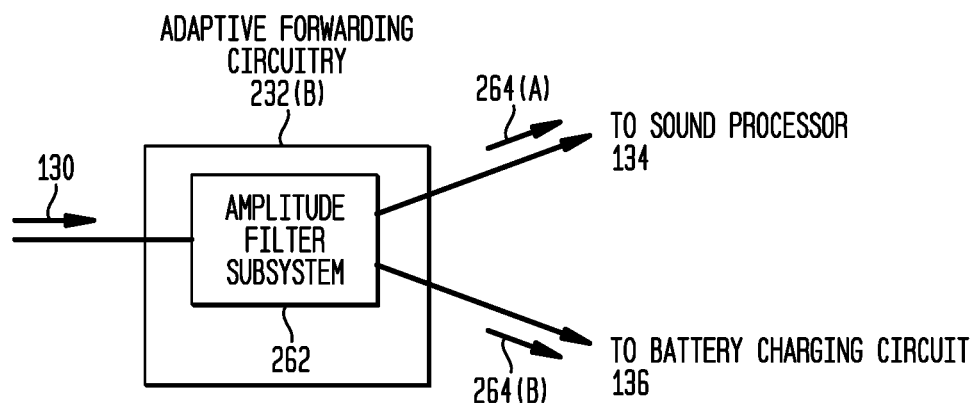
FIG. 2B is a block diagram illustration another embodiment for adaptive forwarding circuitry, in accordance with embodiments presented herein.

In further embodiments, the adaptive forwarding circuitry 132 is also or alternatively configured to forward all or a portion of the electrical signals 130 to the battery charging circuitry 136 based on content or attributes of the sound signals 107 detected by the sound sensor 120. FIGS. 2A and 2B illustrate embodiments of the adaptive forwarding circuitry 132 configured to forward all or a portion of the electrical signals 130 to the battery charging circuitry 136 based on attributes of the sound signals 107.

FIG. 2A illustrates an embodiment of the adaptive forwarding circuitry 132, referred to as adaptive forwarding circuitry 232(A), that includes a frequency filter subsystem 252. The sound signals 107 detected by the sound sensor 120 can include different sound frequencies and, as such, the electrical signals 130 generated by the sound sensor 120 can also be associated with different sound frequencies. However, only certain frequency ranges of the sound signals 107 are useable by the sound processor 134 to evoke a hearing percept. In particular, the general audible range of normal human hearing is generally considered to be from approximately 20 Hertz (Hz) to approximately 20 kilohertz (kHz), but this general range can vary greatly from individual to individual. In addition, implantable auditory prostheses, such as implantable middle ear prosthesis 100, can be configured to only utilize or process a portion of the audible range frequency range. In accordance with embodiments presented herein, the frequency range that is processed and used to evoke hearing percepts is referred to herein as the "operable frequency range" of the implantable middle ear prosthesis 100. The operable frequency range can be different for different types of implantable auditory prostheses, different recipients, etc.

In one possible embodiment, only the electrical signals that are associated with the operable frequency range of the implantable auditory prostheses need to be provided to the sound processor 134. As such, in the embodiment of FIG. 2A, the frequency filter subsystem 252 is configured to determine which electrical signals are associated with frequencies that form part of the operable frequency range of the implantable middle ear prosthesis 100 and/or determine which electrical signals are associated with frequencies outside of the operable frequency range of the implantable middle ear prosthesis 100. The frequency filter subsystem 252 forwards electrical signals that are associated with frequencies that form part of the operable frequency range of the implantable middle ear prosthesis 100 to the sound processor 134 and forwards electrical signals that are associated with frequencies outside of the operable frequency range of the implantable middle ear prosthesis 100 to the battery charging circuitry 136.

Stated differently, the adaptive forwarding circuitry 232 (A), and more particularly the frequency filter subsystem 252, is configured to provide electrical signals associated with at least a first range of sound frequencies to the battery charging circuitry 136 and to provide electrical signals associated with at least a second range of sound frequencies to the sound processor 134. In FIG. 2A, arrow 254(A) represents the frequency portion of the electrical signals 130 that are provided to the sound processor 134, while arrow 254(B) represents the frequency portion of the electrical signals 130 that are provided to the battery charging circuitry 136.

In certain embodiments, the frequency filter subsystem 252 can comprise one or more high pass filters, one or more low pass filters, and/or one or more bandpass filters. The frequency filter subsystem 252 can be a passive component to ensure a net energy surplus in the system.

FIG. 2B illustrates an embodiment of the adaptive forwarding circuitry 132, referred to as adaptive forwarding circuitry 232(B), that includes an amplitude filter subsystem 262. The sound signals 107 detected by the sound sensor 120 can include different sound amplitudes and, as such, the electrical signals 130 generated by the sound sensor 120 can be associated with different sound amplitudes. However, implantable auditory prostheses, such as implantable middle ear prosthesis 100, may only utilize or process sounds at certain amplitudes for use in evoking a hearing percept. For example, sounds with very large amplitudes could potentially damage the hearing of a recipient and can be dropped, reduced, etc. during the processing operations. In accordance with embodiments presented herein, the amplitude range that is processed and used to evoke hearing percepts is referred to herein as the "operable amplitude range" of the implantable middle ear prosthesis 100. The operable amplitude range can be different for different types of implantable auditory prostheses, different recipients, etc.

Only the electrical signals that are associated with the operable amplitude range of the implantable auditory prostheses need to be provided to the sound processor 134. As such, in the embodiment of FIG. 2B, the amplitude filter subsystem 262 is configured to determine which electrical signals are associated with amplitudes that form part of the operable amplitude range of the implantable middle ear prosthesis 100 and/or determine which electrical signals are associated with amplitudes outside of the operable amplitude range of the implantable middle ear prosthesis 100. The amplitude filter subsystem 262 forwards electrical signals that are associated with amplitudes that form part of the operable amplitude range of the implantable middle ear prosthesis 100 to the sound processor 134 and forwards electrical signals that are associated with amplitudes outside of the operable amplitude range of the implantable middle ear prosthesis 100 to the battery charging circuitry 136.

Stated differently, the adaptive forwarding circuitry 232(B), and more particularly the amplitude filter subsystem 262, is configured to provide electrical signals associated with at least a first range of sound amplitudes to the battery charging circuitry 136 and to provide electrical signals associated with at least a second range of sound amplitudes to the sound processor 134. In one arrangement, the amplitude filter subsystem 262 provides electrical signals associated with sound amplitudes that are above a predetermined threshold to the battery charging circuitry 136 and provides electrical signals associated with sound amplitudes that are below the predetermined threshold to the sound processor 134. In FIG. 2B, arrow 264(A) represents the portion of the electrical signals 130 that are provided to the sound processor 134, while arrow 254(B) represents portion of the electrical signals 130 that are provided to the battery charging circuitry 136.

FIGS. 1A, 1B, 2A, and 2B illustrate several embodiments for adaptive forwarding circuitry in accordance with embodiments of the present invention. It is to be appreciated that the various embodiments of FIGS. 1A, 1B, 2A, and 2B are not mutually exclusive and that these embodiment can be combined in different arrangements. For example, adaptive forwarding circuitry in accordance with embodiments presented herein can be configured to: (1) forward all or a portion of the electrical signals 130 to the implantable middle ear prosthesis 100 based on an operation mode or status of the implantable middle ear prosthesis 100, and/or (2) forward all or a portion of the electrical signals 130 to the battery charging circuitry 136 based on attributes of the sound signals 107 detected by the sound sensor 120. In addition, adaptive forwarding circuitry in accordance with embodiments presented herein can include both a frequency filter subsystem as well as an amplitude filter subsystem such that electrical signals associated with certain frequency ranges or electrical signals associated with certain amplitude ranges are provided to the battery charging circuitry 136 and, accordingly, used to recharge the at least one rechargeable battery 138.

In certain embodiments presented herein, the electrical signals that adaptive forwarding circuitry provides to a battery charging circuitry are generated from ambient sound signals. In further embodiments presented herein, an external acoustic charger (external sound source) is used to generate "charging sounds" that are specifically intended to cause adaptive forwarding circuitry in accordance with embodiments presented herein to forward electrical signals to battery charging circuitry.

Figure 3:
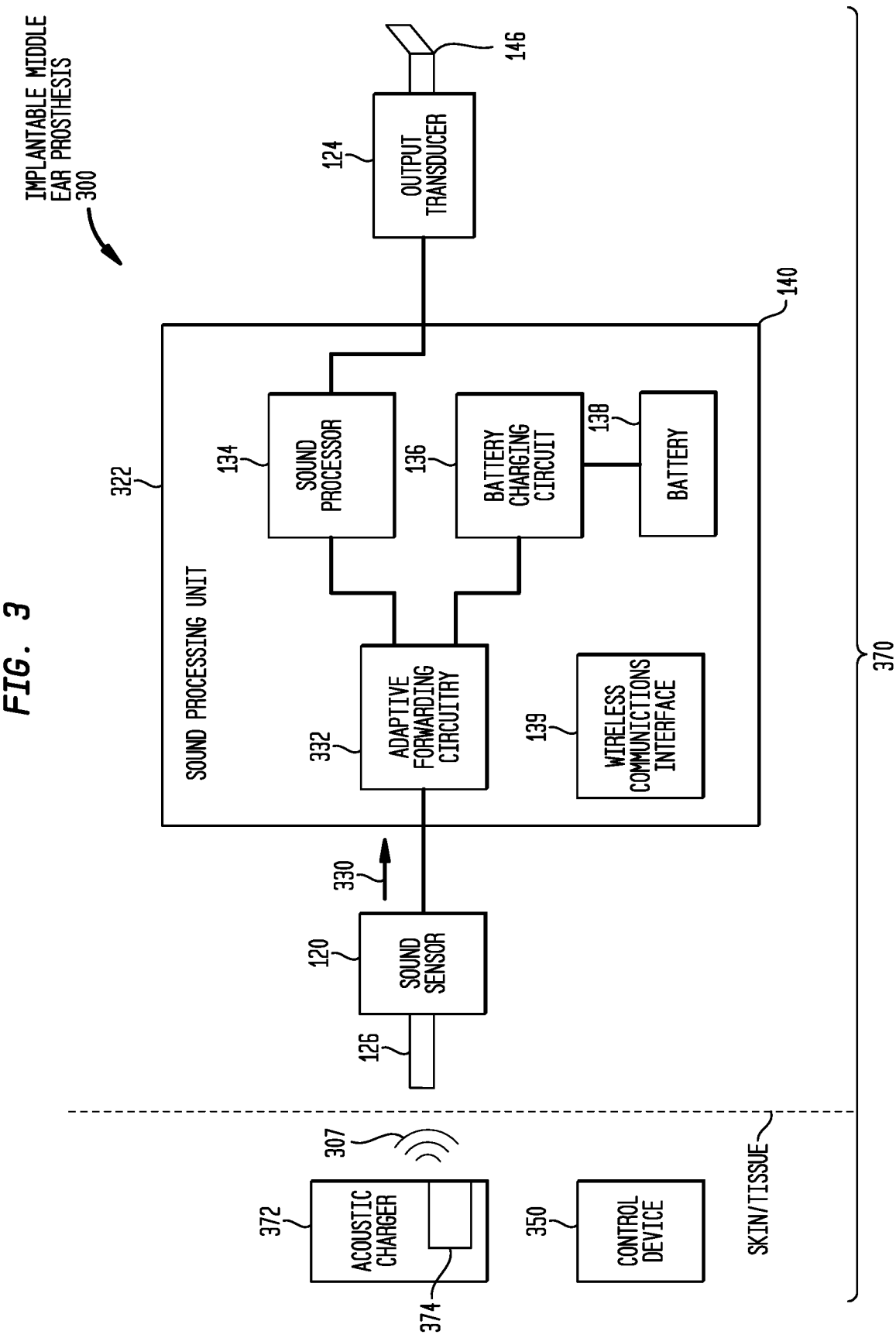
FIG. 3 is a block diagram illustrating an implantable auditory prosthesis system, in accordance with embodiments presented herein.

More specifically, FIG. 3 is a block diagram illustrating an implantable auditory prosthesis system 370 that comprises an implantable middle ear prosthesis 300, an external control device 350, and an external acoustic charger 372. The external control device 350 is substantially similar to external control device 150 of FIG. 1B.

In the illustrative arrangement of FIG. 3, the implantable middle ear prosthesis 300 includes the sound sensor 120 and the output transducer 124 described above with reference to FIGS. 1A and 1B, as well as a sound processing unit 322. The sound processing unit 322 comprises the sound processor 134, the battery charging circuitry 136, the at least one battery 138, and the wireless communications interface 139, all as described above with reference to FIGS. 1A and 1B. The sound processing unit 322 also comprises adaptive forwarding circuitry 332 that is configured to operate, as described above, to selectively forward electrical signals to the sound processor 134 and/or the battery charging circuitry 136. The adaptive forwarding circuitry 332 of FIG. 3 is configured to forward all or a portion of the received electrical signals to the battery charging circuitry 136 based on an operation mode or status of the implantable middle ear prosthesis 300, based on one or more attributes of the sound signals detected by the sound sensor 120, etc.

The external acoustic charger 372 is a device that is configured to deliver selected sound signals 307 to the implantable middle ear prosthesis 300. The selected sound signals 307, sometimes referred to herein as "charging sounds," are generated by a receiver (speaker) 374 in the acoustic charger 373.

The sound sensor 120 receives the charging sounds 307 and converts the charging sounds to electrical signals 330, sometimes referred to herein as "charging signals," which are provided to the adaptive forwarding circuitry 332. The charging sounds 307 are specifically configured such that, when the associated charging signals 330 are received at the adaptive forwarding circuitry 332, the adaptive forwarding circuitry 332 will forward at least a substantial portion of the charging signals to the battery charging circuitry 136. By generating charging sounds 307 that are specifically intended to enable battery charging, the at least one battery 138 can be charged over a shorter period of time, relative to the use of ambient sound for battery charging.

In certain examples, the charging sounds 307 can be one or more sounds that are designed to be inaudible by the recipient and, potentially, other individuals located in proximity to the recipient. For example, the charging sounds 307 can be generated at one of an ultrasonic or infrasonic frequency (i.e., at a frequency that is outside the normal hearing range of a normal person). If the charging sounds 307 are inaudible, the charging sounds could also be generated at a high amplitude to increase the energy transfer (i.e., charge at optimal frequency and amplitude).

As noted above, in certain embodiments the sound sensor 120 is a piezoelectric sensor. A piezoelectric sensor, and potentially other types of sensors, have an associated resonance frequency. In one embodiment, the charging sounds 307 are generated at a frequency that substantially matches the resonance frequency of the piezoelectric or other sensor. This frequency matching can increase efficiency by reducing reduce losses in the energy conversion (i.e., in converting sensed vibration to the electrical signals 330).

In accordance with certain embodiments, depending on the arrangement of the adaptive forwarding circuitry 332, the recipient can continue to perceive ambient sounds during use of the acoustic charger 373. For example, the adaptive forwarding circuitry 332 can be configured to filter/separate ambient sounds from the charging sounds 307 and, accordingly, provide the ambient sounds to the sound processor 134. Alternatively, the acoustic charger 373 can be configured to periodically suspend/pause generation of the charging sounds 307 to enable receipt of ambient sounds.

In certain embodiments, the ambient sounds can be filtered from the charging sounds 307 using a frequency filtering system and/or an amplitude frequency system. In general, the resonance frequency of a sensor should be well over the hearing frequency range and a dedicated charging sound source should be designed to not be audible for a normal hearing person. In such arrangements, it may be possible to charge and evoke hearing percepts simultaneously.

Figure 4:
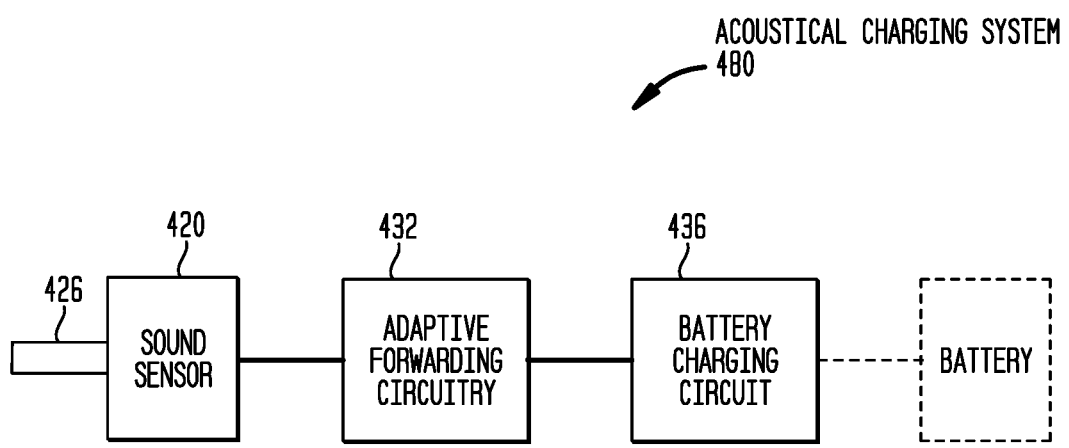
FIG. 4 is a block diagram illustration an acoustical charging system, in accordance with embodiments presented herein.

The acoustical charging techniques have primarily been described above with reference to implementation of the techniques in a specific implantable auditory prosthesis, namely an implantable middle ear prosthesis. However, as noted above, it is to be appreciated that the acoustical charging techniques presented herein can be implemented in a number of other implantable auditory prostheses, such as cochlear implants, auditory brainstem stimulators, electro-acoustic hearing prostheses, bimodal hearing prostheses, direct cochlear stimulators, etc. FIG. 4 is a block diagram illustrating an acoustical charging system 480 that can be incorporated into any of the above or other implantable auditory prosthesis now know or later developed.

The acoustical charging system 480 generally comprises a sound sensor 420 and a coupling element 426 for mechanically coupling of the sound sensor 420 to an auditory element of a recipient's ear (e.g., the tympanic membrane, one or more of the malleus, the incus or the stapes, the oval window, the recipient's round window, the semicircular canals, etc.) that vibrates in response to receipt of sound signals. In certain embodiments, the sound sensor 420 is a piezoelectric sensor.

The acoustical charging system 480 also comprises adaptive forwarding circuitry 432 and battery charging circuitry 436. In operation, the sound sensor 420 is configured to convert detected vibration (vibration caused by receipt of sound signals at the ear of the recipient) into electrical signals that are provided to the adaptive forwarding circuitry 432. The adaptive forwarding circuitry 432 is configured to provide all or a portion of the electrical signals received from the sound sensor 420 to the battery charging circuitry 436 for use in charging an implantable battery.

It is to be appreciated that an acoustical charging system in accordance with embodiments presented herein, such as acoustical charging system 480, can be incorporated into an implantable auditory prostheses in a number of different manners and can be used for a number of different purposes. For example, the acoustical charging system 480 can operate as a primary battery charging mechanism or as a supplemental battery charging mechanism. Additionally, the sound sensor 420 can be a primary sound sensor for the implantable auditory prostheses that is used to generate electrical signals for use by a sound processor, as well as to generate electrical signals for use by the battery charging circuitry 436. In such embodiments, the acoustical charging system 480 is sometimes referred to as being "inline" with the sound processor (i.e., in the sound processing path) and the adaptive forwarding circuitry 432 operates to selectively provide electrical signals to each of the sound processor and the battery charging circuitry 436.

In these embodiments, the adaptive forwarding circuitry 432 can be configured in a number of different manners so as to, under certain conditions, selectively forward all or a portion of the electrical signals received from the sound sensor 420 to the battery charging circuitry 436. For example, the adaptive forwarding circuitry 432 can be configured to: (1) forward all or a portion of the electrical signals 130 to the battery charging circuitry 436 based on an operation mode or status of the implantable auditory prosthesis, (2) to forward all or a portion of the electrical signals to the battery charging circuitry 436 based on one or more attributes of the sound signals detected by the sound sensor 420, etc. In addition, the adaptive forwarding circuitry 432 can include both a frequency filter subsystem as well as an amplitude filter subsystem such that electrical signals associated with certain frequency ranges and/or electrical signals associated with certain amplitude ranges are provided to the battery charging circuitry 436 and, accordingly, used to recharge the at least one rechargeable battery 138.

It is to be appreciated that the use of the acoustical charging system 480 "inline" with a sound processor of an implantable auditory prosthesis is one example. In alternative embodiments, the sound sensor 420 can be a supplemental sound sensor that is dedicated to battery charging operations, sometimes referred to herein as a "charging sound sensor." In such embodiments, the adaptive forwarding circuitry 432 is connected to the battery charging circuitry 436, but not to a sound processor. As such, the adaptive forwarding circuitry 432 can provide substantially all of the electrical signals generated by the charging sound sensor 420 to the battery charging circuitry 436 for use in battery charging operations.

Figure 5:
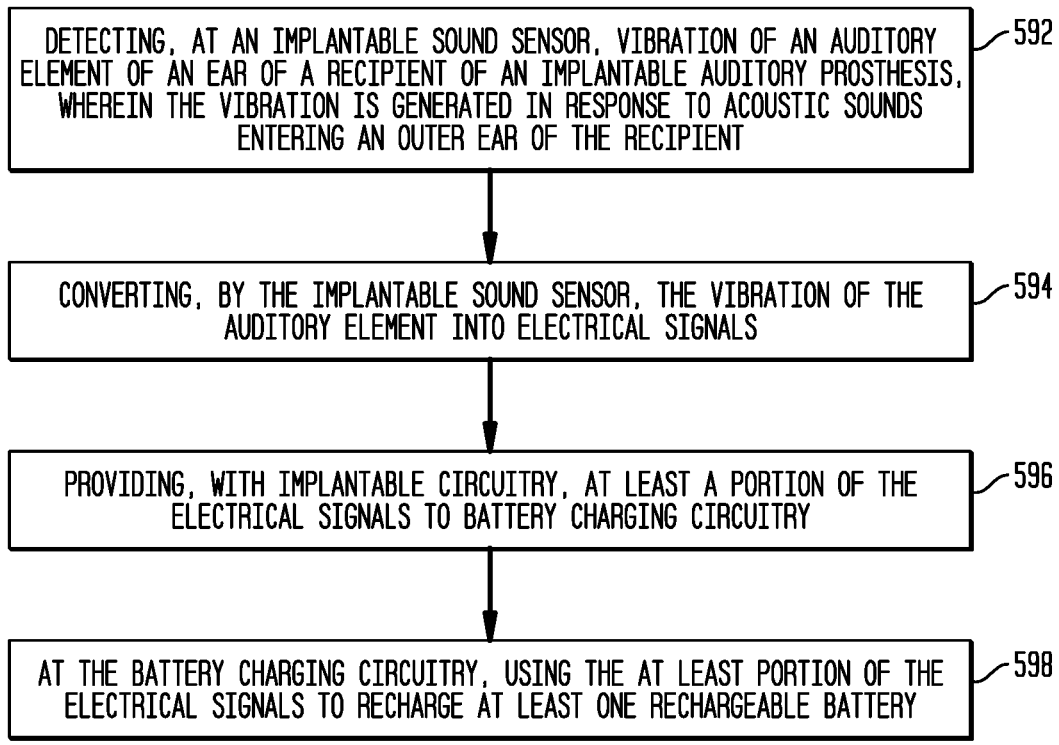
FIG. 5 is a flowchart illustrating a method, in accordance with embodiments presented herein.

FIG. 5 is a flowchart of a method 590 in accordance with embodiments presented herein, Method 590 begins at 592 where an implantable sound sensor detects vibration of an auditory element of an ear of a recipient of an implantable auditory prosthesis. The vibration is generated in response to acoustic sounds entering an outer ear of the recipient. At 594, the implantable sound sensor converts the vibration of the auditory element into electrical signals. At 596, implantable circuitry provides at least a portion of the electrical signals to battery charging circuitry. At 598, the battery charging circuitry uses the at least portion of the electrical signals to recharge at least one rechargeable battery.

As noted above, presented herein are acoustical charging techniques for implantable auditory prostheses. In accordance with the acoustical charging techniques, a sound sensor implanted in a recipient is configured to detect sound signals. The sound sensor is configured to convert the detected sound signals into electrical signals that can be used to charge the implantable rechargeable battery. In certain embodiments, the electrical signals are provided to adaptive forwarding circuitry that is configured to selectively provide the electrical signals to a sound processor for use in evoking a hearing percept or to a battery charging circuitry for recharging the implantable rechargeable battery.

The techniques may be particularly advantageous in implantable auditory prostheses that do not have an associated external method. Such prostheses typically include an implanted battery that cannot be recharged. Instead, surgery is performed to replace the battery after the battery has been depleted (e.g., the battery is replaced every few years). The incorporation of an acoustical charging system in accordance with embodiments presented herein into such devices, coupled with replacement of the implanted battery with a rechargeable battery, could substantially reduce the need for these periodic surgeries.

It is to be appreciated that the embodiments presented herein are not mutually exclusive.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. An implantable auditory prosthesis, comprising:
   a sound processor;
   at least one rechargeable battery;
   battery charging circuitry configured to charge the at least one rechargeable battery;
   a piezoelectric sensor configured to convert acoustic sound signals received at an ear of a recipient into electrical signals; and
   adaptive forwarding circuitry configured to selectively deliver the electrical signals generated from the acoustic sound signals to one of the battery charging circuitry or the sound processor,
   wherein the electrical signals are associated with different sound frequencies, and wherein the adaptive forwarding circuitry comprises a frequency filter subsystem configured to provide electrical signals associated with at least a first range of sound frequencies to the battery charging circuitry and to provide electrical signals associated with at least a second range of sound frequencies to the sound processor.

2. The implantable auditory prosthesis of claim 1, wherein the sound processor is configured to be disabled for a period of time, and wherein the adaptive forwarding circuitry is configured to provide all electrical signals received during the period of time in which the sound processor is disabled to the battery charging circuitry.

3. The implantable auditory prosthesis of claim 1, wherein the piezoelectric sensor has a resonant frequency outside a normal human audible frequency range, and wherein the adaptive forwarding circuitry is configured to deliver electrical signals generally corresponding to the resonant frequency to the battery charging circuitry.

4. A system including the implantable auditory prosthesis of claim 1 and an external acoustical charger, wherein the external acoustical charger is configured to deliver charging sounds to the ear of the recipient, wherein the charging sounds cause the piezoelectric sensor to generate charging electrical signals and wherein the adaptive forwarding circuitry is configured to deliver the charging electrical signals to the battery charging circuitry.

5. The system of claim 4, wherein the piezoelectric sensor has an associated resonant frequency, and wherein the charging sounds are generated at a frequency that corresponds to the resonant frequency of the piezoelectric sensor.

6. The system of claim 5, wherein the charging sounds are generated at one of an ultrasonic or infrasonic frequency.

7. An implantable auditory prosthesis, comprising:
   at least one rechargeable battery;
   battery charging circuitry configured to charge the at least one rechargeable battery;
   an implantable sound sensor configured to convert acoustic sound signals into electrical signals;
   a sound processor; and
   circuitry configured selectively deliver portions of the electrical signals generated from the acoustic sound signals to the sound processor or to the battery charging circuitry for use in charging the at least one rechargeable battery.

8. The implantable auditory prosthesis of claim 7, wherein the circuitry is configured to selectively deliver portions of the electrical signals to the sound processor or the battery charging circuitry based on an operational mode of the implantable auditory prosthesis.

9. The implantable auditory prosthesis of claim 7, wherein the circuitry is configured to selectively deliver portions of the electrical signals to the sound processor or the battery charging circuitry based on attributes of the acoustic sound signals.

10. The implantable auditory prosthesis of claim 9, wherein the circuitry is configured to selectively deliver portions of the electrical signals to the sound processor or the battery charging circuitry based on a frequency of the acoustic sound signals used to generate the respective electrical signals.

11. The implantable auditory prosthesis of claim 9, wherein the circuitry is configured to selectively deliver portions of the electrical signals to the sound processor or the battery charging circuitry based on an amplitude of the acoustic sound signals used to generate the respective electrical signals.

12. The implantable auditory prosthesis of claim 7, wherein the implantable sound sensor is a piezoelectric sensor.

13. The implantable auditory prosthesis of claim 7, wherein the implantable sound sensor is a subcutaneous microphone.

14. The implantable auditory prosthesis of claim 7, wherein the implantable sound sensor is a tube microphone.

15. A method, comprising:
   detecting, at an implantable sound sensor, vibration of an auditory element of an ear of a recipient of an implantable auditory prosthesis, wherein the vibration is generated in response to acoustic sounds entering an outer ear of the recipient;

converting, by the implantable sound sensor, the vibration of the auditory element into electrical signals;
providing, with implantable circuitry, at least a portion of the electrical signals to battery charging circuitry based on a status of the implantable auditory prosthesis; and
at the battery charging circuitry, using the at least portion of the electrical signals to recharge at least one rechargeable battery.

16. The method of claim 15, wherein converting, by the implantable sound sensor, the vibration of the auditory element into electrical signals comprises:
converting the vibration into electrical signals with a piezoelectric sensor.

17. The method of claim 15, further comprising:
generating the acoustic sounds at an external acoustical charger, wherein the acoustic sounds are charging sounds specifically configured for use in charging the least one rechargeable battery.

18. The method of claim 17, wherein the sound sensor has an associated resonant frequency, wherein and generating the acoustic sounds at the external acoustical charger comprises:
generating the acoustic sounds at a frequency that corresponds to the resonant frequency of the sound sensor.

19. The method of claim 17, wherein generating the acoustic sounds at the external acoustical charger comprises:
generating the acoustic sounds at one of an ultrasonic or infrasonic frequency.

20. The method of claim 15, wherein the implantable auditory prosthesis includes a sound processor, and wherein the method further comprises:
selectively delivering one or more portions of the electrical signals to the sound processor or the battery charging circuitry.

21. An implantable auditory prosthesis, comprising:
a sound processor;
at least one rechargeable battery;
battery charging circuitry configured to charge the at least one rechargeable battery;
a piezoelectric sensor configured to convert acoustic sound signals received at an ear of a recipient into electrical signals; and
adaptive forwarding circuitry configured to selectively deliver the electrical signals generated from the acoustic sound signals to one of the battery charging circuitry or the sound processor,
wherein the electrical signals are associated with different sound amplitudes, and wherein the adaptive forwarding circuitry comprises an amplitude filtering subsystem configured to provide electrical signals associated with sound amplitudes that are above a predetermined threshold to the battery charging circuitry and to provide electrical signals associated with sound amplitudes that are below the predetermined threshold to the sound processor.

22. The implantable auditory prosthesis of claim 21, wherein the sound processor is configured to be disabled for a period of time, and wherein the adaptive forwarding circuitry is configured to provide all electrical signals received during the period of time in which the sound processor is disabled to the battery charging circuitry.

23. A method, comprising:
detecting, at an implantable sound sensor, vibration of an auditory element of an ear of a recipient of an implantable auditory prosthesis, wherein the vibration is generated in response to acoustic sounds entering an outer ear of the recipient;
converting, by the implantable sound sensor, the vibration of the auditory element into electrical signals;
providing, with implantable circuitry, at least a portion of the electrical signals to battery charging circuitry based on attributes of the acoustic sounds; and
at the battery charging circuitry, using the at least portion of the electrical signals to recharge at least one rechargeable battery.

24. The method of claim 23, wherein providing the at least portion of the electrical signals to the battery charging circuitry based on attributes of the acoustic sounds comprises:
providing the at least portion of the electrical signals to the battery charging circuitry based on a frequency of the acoustic sounds used to generate the respective electrical signals.

25. The method of claim 23, wherein providing the at least portion of the electrical signals to the battery charging circuitry based on attributes of the acoustic sounds comprises:
providing the at least portion of the electrical signals to the battery charging circuitry based on an amplitude of the acoustic sounds used to generate the respective electrical signals.

26. The method of claim 23, wherein converting, by the implantable sound sensor, the vibration of the auditory element into electrical signals comprises:
converting the vibration into electrical signals with a piezoelectric sensor.

* * * * *